Dec. 13, 1955  W. ZUCKER  2,726,893
REMOTE CONTROL AUTOMOBILE DOOR OPERATOR
Filed Nov. 20, 1952  2 Sheets-Sheet 1

INVENTOR
William Zucker
BY *Gustave Miller*
ATTORNEY

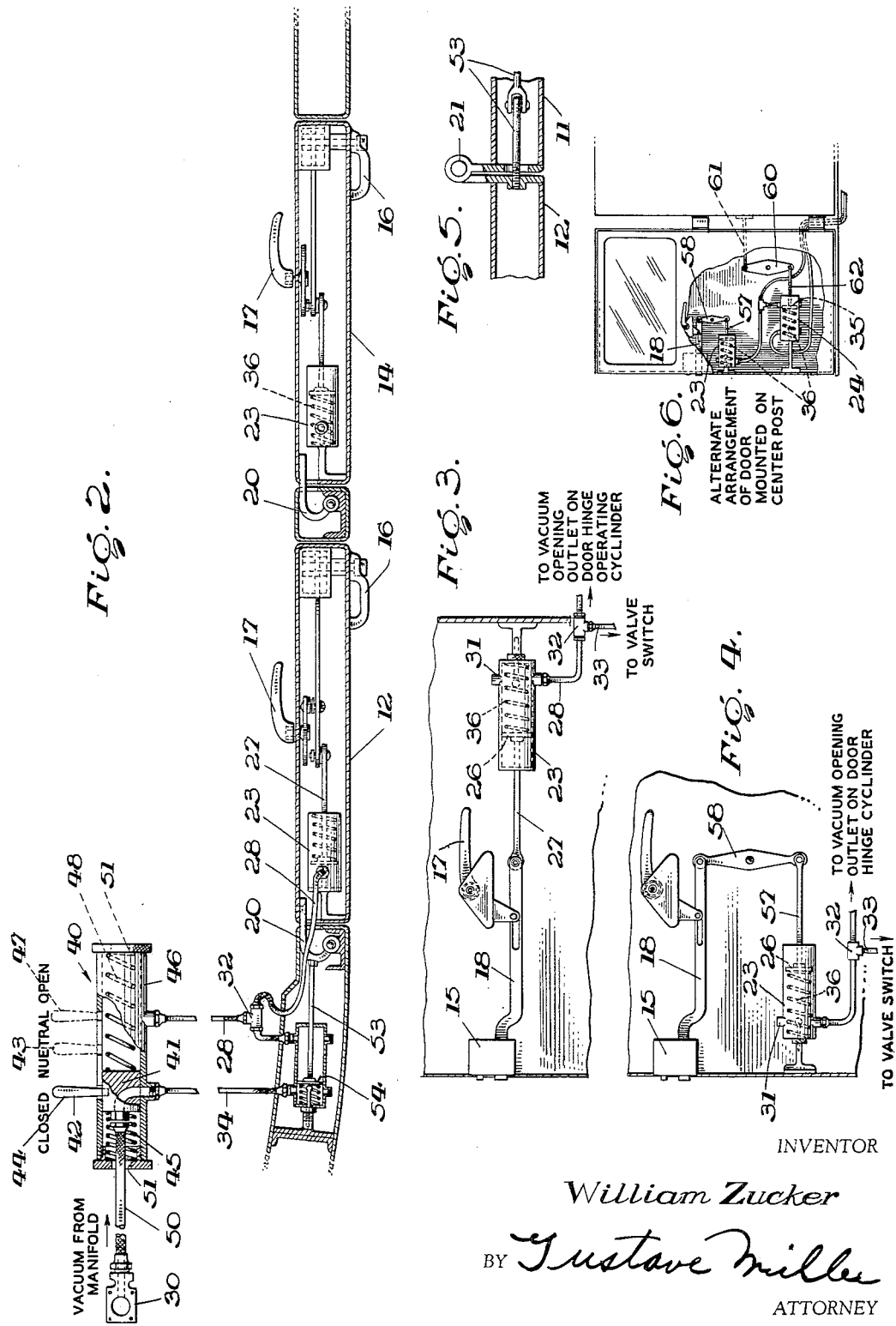

United States Patent Office 2,726,893
Patented Dec. 13, 1955

2,726,893

REMOTE CONTROL AUTOMOBILE DOOR OPERATOR

William Zucker, New York, N. Y.

Application November 20, 1952, Serial No. 321,536

1 Claim. (Cl. 296—44)

This invention relates to a remote control automobile door operator and has for an object to provide a remote control means for both opening and closing automobile doors by manipulation thereof from the driver's seat while simultaneously permitting the door to be opened and closed in its usual manner by manipulation of the usual handle means inside and outside the door, without interference between the remote control operator means of this invention and the usual operating means.

In sedans, limousines, and taxicabs, it is often desirable for the driver to be able to operate any of the doors from his position in the driver's seat, and with this in view, one of the objects of this invention is to provide a power operated means for either opening or closing any of the doors without any interference with the usual opening or closing of the doors in the usual manner.

A further object of this invention is to provide a power operated means for both opening and closing the doors of an automobile without interfering with the usual manner of opening or closing the doors, which power operated means will be operated by a suitable source of pressure differential, including the suction available from the manifold of the motor of the automobile.

A further object of this invention is to provide a power operated door opening and closing means wherein a major part of the operating means may be concealed completely within the door or partly under the engine hood, and wherein only a valve control means will be located adjacent the driver, such as on the instrument board, whereby the mechanism of this invention will not occupy any of the space normally available to the vehicle passengers.

A further object of this invention is to provide a door opening and closing mechanism for an automobile door, whose operating parts are comparatively simple and inexpensive and require little maintenance, and which may be added as accessory equipment to existing automobiles, or may be installed as initial equipment when the automobile is first built.

With the foregoing and other objects in view, this invention comprises the combination, construction and arrangement of parts hereinafter set forth, claimed and disclosed in the accompanying drawings, wherein:

Fig. 2 is a phantom sectional view.

Fig. 3 is a fragmentary detail showing the latch operating cylinder.

Fig. 4 is a fragmentary detail of a slightly modified form of connecting the latch operating cylinder to the latch mechanism.

Fig. 5 is a fragmentary detail as applied to a door having a straight hinge.

Fig. 6 shows an alternate hook-up of this invention for use on a door mounted on a center post.

Figure 1:
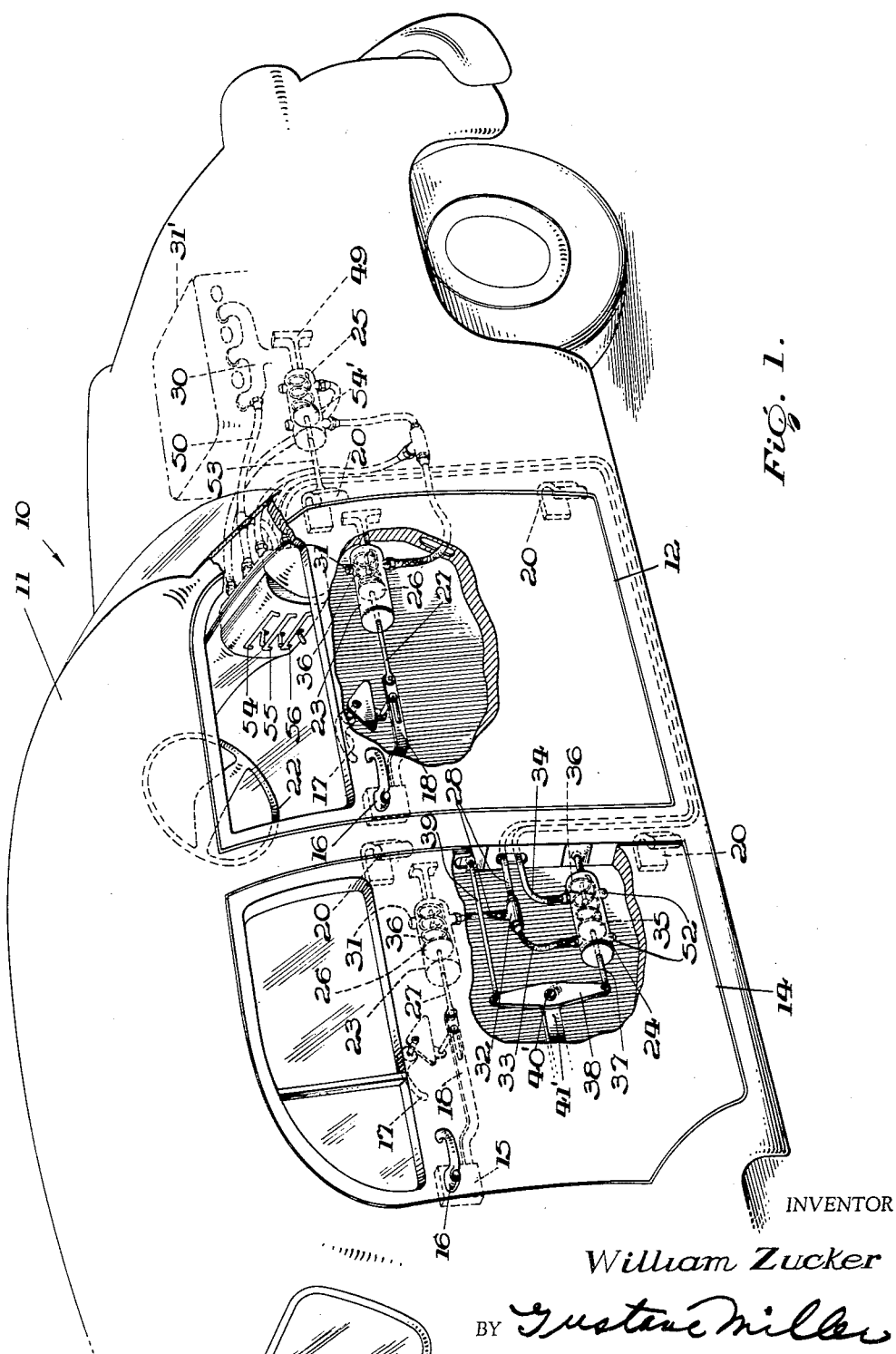
Fig. 1 is a perspective X-ray view showing an installation of this invention.

There is shown at 10 a motor vehicle having a body 11 of the sedan, limousine, or taxicab type, here shown as being provided with a front door 12 and a rear door 14 each having the usual snap latch actuating mechanism 15 with the usual outside handle 16, and the usual inside handle 17 and its customary linkage 18 for retracting the latch mechanism 15 in the usual manner. As shown in Figs. 1 and 2, the doors 12 and 14 may each be provided with the usual C hinges 20, which are normally invisible when the doors are closed, but the invention may equally be applied to doors having the straight type of hinge 21 as shown in Fig. 5. All of the door latch and handle mechanism as thus far described operates in the usual manner, and continues to operate in the usual manner when this invention is present whenever it is desired to do so without utilizing this invention. That is, the customary operation of the usual handles and latch mechanism does not in any way interfere with the use of the power operated mechanism of this invention for power opening and power closing the doors, and likewise, the presence of the power operated mechanism of this invention for opening or closing the doors does not in any way interfere with the usual and customary manner of operating the conventional handle and latch mechanism.

This invention may be applied to any door in an automobile, but customarily it would be applied to all the doors of an automobile, except possibly that one which is closest to the driver's position behind the steering wheel 22. In applying the invention to any one door, there is utilized a first latch mechanism opening cylinder 23, which is mounted rigidly within and concealed within the door which it operates, and a second door opening or closing cylinder, which may also be mounted within and concealed within the door as at 24, or may be mounted within the automobile wall, or on the engine compartment as at 25.

As shown, the first or door latch mechanism opening cylinder 23 includes a piston 26 operable therewithin, a connecting rod 27 linking the piston 26 to one end of the door latch mechanism operating linkage 18. This cylinder 26 is connected at one end by a hollow conduit 28 to a source of pressure differential which may be either a pressure reservoir or a partial vacuum resulting from the suction of the automobile engine caburetor. As shown, the source of pressure differential is the suction available from the intake manifold 30 of the motor 31' of the motor vehicle 10. Utilizing suction as the source of pressure differential, the conduit 28 is connected to the cylinder 26 at the end thereof, away from where the connecting rod 27 connects the piston 26 to the link 18, but if pressure as from a pump were used as a source of power instead of suction, then the conduit 28 would be obviously at the other end of the cylinder 23. The pressure differential or suction is intended to move the piston 26 only in the door latch opening mechanism, and to assist the piston 26 in returning to its normal non-operative position, a spring 36 is provided in the cylinder 23. A pressure release valve 31 may be provided on the cylinder 23 for venting the cylinder to the atmosphere when the pressure differential or suction is not in operation.

Venting from the pressure source conduit 28 through a T nipple 32 is a hollow conduit 33 leading to the second cylinder 24. This restrictive T nipple 32 will have a smaller opening leading to the conduit 33 than it does to the branch leading to the first cylinder, so that the suction will operate more quickly through the first cylinder 23, and thus, operate the latch mechanism to unlatch the door, and thus, permit the second cylinder 24 to operate the door in a door opening direction. This second cylinder 24 has a second suction conduit 34 connected thereto at the opposite end thereof, and is also provided with a piston 35 having a yieldable spring 36 on the door opening side of the piston 35 acting as a door check and piston stop.

A connecting rod 37 secured to the piston 35 is pivoted at its other end to a pivoted lever 38. The lever 38 is pivoted at 40' directly or indirectly to the structure of the door 14 as at 41'. At the other end of the pivoted lever 38, a link 39 is provided pivoted at one end to the lever 38, and at its other end to the same part of the body 11, the door pillar, to which the C hinge 20 is mounted. The suction lines 28 and 34 are connected to the vacuum in intake manifold 30 indirectly through a three way control valve means 40. This three way valve means 40 includes a valve piston 41 manually movable by means of a handle 42 from a neutral position 43 to a closed position 44 against a yieldable spring 45 within one end of the valve cylinder 46, and to an open position 47 against another yieldable spring 48 at the other end of the valve cylinder 46. The valve piston 41 is connected by a flexible hollow conduit 50 to the intake manifold 30.

In operation, the springs 48 and 45 normally return the valve handle 42 to the neutral position 43 except when they are manually held in either the open position 47 or closed position 44. Moving the valve handle 42 to open position 47 causes valve piston 41 to connect suction from the manifold 30 through the restrictive T nipple 32 to first cause the suction in the first cylinder 23 to be created between the side of piston 26 therewithin that is away from its connecting rod 27, thus, drawing connecting rod 27 therewithin and operating link 18 to operate the latch mechanism 15 in a latch opening direction. Then, as this action is completed, suction will build up through the restriction in the nipple 32 through the conduit branch 33 to the opening side of the second cylinder 24 and through its connecting rod 37, pivot lever 38 and link 39 push against the body part and gently open the door 14 to the limit provided by its piston 35 abutting against the door check spring 36 therewithin.

It will be noted that each end of the three way valve means cylinder 46 is provided with flexible conduit openings 51, and hence, when the piston 41 is in the open position 47, the conduit 34 will be vented through the adjacent flexible conduit opening 51 to the atmosphere, thus, permitting easy operation of the piston 35 in the door opening direction. When the handle is in closed position 44 the conditions are reversed, that is, the other flexible conduit opening 51 is then connected through hollow conduit 28 to vent that side of the piston 35 to the atmosphere in addition to venting the opening side of the first cylinder piston 23 to the atmosphere. However, additional pressure release valves 52 are provided at each end of the second cylinder 24 to avoid any pressure lag, particularly during operation of the door by its usual handles 16 and 17 and latch mechanism 15.

Instead of mounting the second door opening and closing cylinder 24 within the door, it may be mounted between the walls of the automobile outside of the door, or within the engine compartment as at 25 and be rigidly supported by means of a supporting member 49 suitably secured within the engine compartment, particularly in connection with the opening of the front door 12. In this case, a connecting rod 53 from the cylinder piston 54' is pivotally secured to one of the C hinges 20 to thus push or pull against the C hinge 20 to open or close the door. Otherwise, construction and operation of the second cylinder 25 is identical with that of the second cylinder 24 when it is mounted within the door.

As shown in Fig. 1, the three way valve means includes a separate valve means for each door that is to be operated, here shown as providing an individual valve means for each of three doors in the automobile, as at 54, 55 and 56.

Inasmuch as similar latch mechanism 15 and an external handle 16 is often normally used for the trunk door, this invention may also be applied to the trunk door at the rear of the automobile in the same manner as applied to the passenger doors as just described.

Inasmuch as all automobile doors are not identical, in some cases different hook ups may be necessary in transmitting the movement of the cylinder piston to the latch mechanism or to the door hinge supporting part of the body 10. As shown in Fig. 4, the movement of the first cylinder piston may be transmitted by means of a connecting rod 57 and a pivoted lever 58 to the latch mechanism operating link 18.

As shown in Fig. 6, a similar pivoted lever 60 is provided between a door operating link 61 and the connecting rod 62 through the piston within the first cylinder.

As above pointed out, operating the particular handle 54, 55 or 56 for the particular door desired while the motor 31 is operating to create suction in the manifold 30, or other pressure differential creating means, will cause when the handle is moved to the open position, the latch mechanism to first be released and the door then to be opened to open position. Releasing the handle will cause its springs to restore it to neutral position. Moving the handle to closed position will actuate the selected door in the opposite direction. The presence of operation of the power means of this invention does in no way interfere with the normal operation of the door by its usual handles, and vice versa the operation of the door in its normal manner, its usual handles will not interfere with subsequent operation by the power means of this invention.

While the device has been shown and the structure described in detail, it is obvious that this invention is not to be considered as being limited to the very exact form disclosed, and that changes in detail and construction may be made therein within the scope of what is claimed, without departing from the spirit of this invention.

Having thus set forth and disclosed the nature of this invention, what is claimed is:

An attachment for mechanical actuation of a vehicle door from a point remote from said door, said door being adapted for use with a motor vehicle having a body in which said door is positioned, said door including connected inner and outer panels, and adapted to be swung to open and closed positions selected, said door also being provided with conventional manually releasable snap latch mechanism for holding the door closed and conventional inner and outer handles for the manual release of said latch mechanism; said attachment comprising a first cylinder positioned between said inner and outer door panels, means for fixedly securing said first cylinder between said panels, a piston operable within said cylinder, a piston rod secured at one end to said piston and attached at its other end to said conventional latch mechanism, a second cylinder positioned between said panels at a point adjacent said first cylinder, a piston in said second cylinder, a piston rod and linkage pivotally connecting said last mentioned piston to a hinge pillar of said door, a source of power for actuating both of said pistons, connections between said source of power and each of said cylinders, a three-way valve for directing said source power to either of said cylinders to actuate its associated piston, said piston rod having a slot therein, a lost motion pin connection with the inside door handle, the first said valve means selectively venting either side of said second cylinder and simultaneously disconnecting said source of power, the linkage between said conventional latch means being adapted to be activated first by said first piston and its associated linkage connecting means and second by the second said piston and its associated door swinging mechanism, and spring means for retaining the pistons of each cylinder in retracted position, said cylinders being arranged in vertical parallelism, said cylinders, pistons and linkage being contained between said panels of said doors.

References Cited in the file of this patent
UNITED STATES PATENTS

| | | |
|---|---|---|
| 1,555,174 | Williams | Sept. 29, 1925 |
| 1,864,468 | Pieper | June 21, 1932 |
| 1,938,502 | Steindler et al. | Dec. 5, 1933 |
| 1,991,611 | Gano | Feb. 19, 1935 |
| 2,086,025 | Gano, Jr. | July 6, 1937 |
| 2,116,446 | Nishimura | May 3, 1938 |
| 2,187,935 | Craig | Jan. 23, 1940 |
| 2,348,306 | Parsons | May 9, 1944 |
| 2,352,929 | Worgess | July 4, 1944 |
| 2,628,091 | Rappl | Feb. 10, 1953 |